United States Patent
Yamauchi

(10) Patent No.: US 6,800,986 B2
(45) Date of Patent: Oct. 5, 2004

(54) PIEZOELECTRIC SENSOR

(75) Inventor: Katsumi Yamauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/347,258

(22) Filed: Jan. 21, 2003

(65) Prior Publication Data

US 2004/0084999 A1 May 6, 2004

(30) Foreign Application Priority Data

Feb. 28, 2002 (JP) ........................................ 2002-054126
May 22, 2002 (JP) ........................................ 2002-148115

(51) Int. Cl.[7] .......................................... H01L 41/083
(52) U.S. Cl. ........................ 310/348; 310/328; 310/366
(58) Field of Search ............................... 310/328, 348, 310/366

(56) References Cited

U.S. PATENT DOCUMENTS

| | | | | | |
|---|---|---|---|---|---|
| 4,267,480 | A | * | 5/1981 | Kanematsu et al. | 310/366 |
| 4,695,756 | A | * | 9/1987 | Tanaka | 310/355 |
| 4,857,791 | A | * | 8/1989 | Uchino et al. | 310/321 |
| 5,438,232 | A | * | 8/1995 | Inoue et al. | 310/328 |
| 5,925,970 | A | * | 7/1999 | Unami et al. | 310/328 |
| 6,081,066 | A | * | 6/2000 | Tsutsui | 310/348 |
| 6,291,932 | B1 | * | 9/2001 | Maruyama et al. | 310/366 |
| 6,359,373 | B1 | * | 3/2002 | Buckley et al. | 310/328 |

FOREIGN PATENT DOCUMENTS

| | | | | |
|---|---|---|---|---|
| JP | A 7-202283 | 8/1995 | ........... | H01L/41/08 |
| JP | A 8-29447 | 2/1996 | ........... | G01P/15/09 |
| JP | A 9-49855 | 2/1997 | ........... | G01P/15/09 |
| JP | A 9-54111 | 2/1997 | ........... | G01P/15/09 |
| JP | A 9-264901 | 10/1997 | ........... | G01P/15/09 |

* cited by examiner

*Primary Examiner*—Thomas M. Dougherty
(74) *Attorney, Agent, or Firm*—Oliff & Berridge, PLC.

(57) ABSTRACT

A piezoelectric device includes electrode films and piezoelectric ceramic layers. The piezoelectric ceramic layers have a number of at least 4 and are alternately laminated with the electrode films. A first support member has a first projection, whereas a second support member has a second projection. The first and second support members are arranged such that the first and second projections are opposed to each other. The piezoelectric device is disposed between the first and second projections, and is held by end faces of the first and second projections.

11 Claims, 19 Drawing Sheets

PIEZOELECTRIC SENSOR

BACKGROUND OF THE INVENTION

1. Field of the Invention

The present invention relates to a piezoelectric sensor employed for an acceleration sensor and the like.

2. Related Background Art

This kind of piezoelectric sensor is used for detecting acceleration or shock in hard disk drives, airbag systems, electronically controlled suspension systems, and the like, for example. It is very important for such a piezoelectric sensor to have a high-degree of reliability, a small number of parts, and a compact size.

Known as examples of documents disclosing techniques satisfying such a requirement include Japanese Patent Application Laid-Open Nos. HEI 8-29447, HEI 9-54111, and HEI9-264901. In the techniques disclosed in these known documents, a base member is provided with a depression and a device attachment, and a piezoelectric device is secured to the device attachment. The piezoelectric device is attached to the device attachment so as to form a gap between the side and bottom faces of the depression.

SUMMARY OF THE INVENTION

The techniques disclosed in the above-mentioned known documents employ a bimorph piezoelectric device as the piezoelectric device. The bimorph piezoelectric device is constituted, for example, by two single-plate piezoelectric devices stacked and combined together. It is difficult for this kind of bimorph piezoelectric device to increase its electric charge sensitivity, since its electrostatic capacity is relatively small.

For securing a large electrostatic capacity in order to increase the electric charge sensitivity, the bimorph piezoelectric device must be made larger, whereby the piezoelectric sensor having incorporated the bimorph piezoelectric device therein becomes greater in size.

It is an object of the present invention to provide a piezoelectric sensor which can improve its electric charge sensitivity and reduce its size.

For achieving the above-mentioned object, the present invention provides a piezoelectric sensor comprising a piezoelectric device including a plurality of electrode films and a plurality of piezoelectric ceramic layers; a first support member having a first projection; and a second support member having a second projection; wherein the piezoelectric ceramic layers have a number of at least 4 and are alternately laminated with the electrode films; wherein the first and second support members are arranged such that the first and second projections are opposed to each other; and wherein the piezoelectric device is disposed between the first and second projections and held between an end face of the first projection and an end face of the second projection.

In the piezoelectric sensor in accordance with the present invention, as mentioned above, the first and second support members are arranged such that the first and second projections are opposed to each other. The piezoelectric device is disposed between the first and second projections, and is held by the end faces of the first and second projections. As a consequence, when an exciting force, a shock, or the like is applied, a portion of the piezoelectric device near its part held by the first and second projections deforms in response to the exciting force, thereby generating a detection signal.

Further, in the present invention, at least four piezoelectric ceramic layers are alternately laminated with the electrode films. Using these four or more piezoelectric ceramic layers can secure a larger electrostatic capacity, thus allowing the electric charge sensitivity to improve.

Also, the use of at least four piezoelectric ceramic layers can secure a larger electrostatic capacity without increasing the size of the piezoelectric device. As a consequence, the piezoelectric sensor incorporating the piezoelectric device therein can be prevented from increasing its size, whereby the piezoelectric sensor can be made smaller.

In the piezoelectric device, some of the electrode films may be connected to each other by way of a through hole formed in the piezoelectric ceramic layers. The use of the through hole can easily realize complicated interlayer connections between electrode films.

In a specific mode, the piezoelectric device has a longitudinally intermediate part held between the end faces of the first and second projections. When an exciting force, a shock, or the like is applied in this mode, parts on both sides of the intermediate part held by the first and second projections deform in response to the exciting force.

In another specific mode, one longitudinal end part of the piezoelectric device is held by the end faces of the first and second projections. When an exciting force, a shock, or the like is applied in this mode, a part on the end side opposite from the end part held by the first and second projections deforms in response to the exciting force.

In a preferred configuration of the piezoelectric sensor in accordance with the present invention, the first support member comprises a first contact electrode disposed at the end face of the first projection, whereas the second support member comprises a second contact electrode disposed at the end face of the second projection. In the piezoelectric device, the electrode films are disposed between the piezoelectric ceramic layers, and on both outer faces of the laminate formed by the piezoelectric ceramic layers, whereas the electrode films on both outer faces are electrically connected to the first and second contact electrodes by the holding. In such a configuration, detection signals generated upon application of exciting forces, shocks, and the like are taken from the electrode films on both outer faces to the outside by way of the first and second contact electrodes.

Other objects, configurations, and advantages of the present invention will be explained in further detail with reference to the accompanying drawings. However, these drawings are given by way of illustration only.

DESCRIPTION OF THE PREFERRED EMBODIMENTS

In the following, preferred embodiments of the piezoelectric sensor in accordance with the present invention will be explained in detail with reference to the accompanying drawings. Here, constituents identical to each other will be referred to with numerals identical to each other without repeating their overlapping explanations.

First Embodiment

Figure 1:
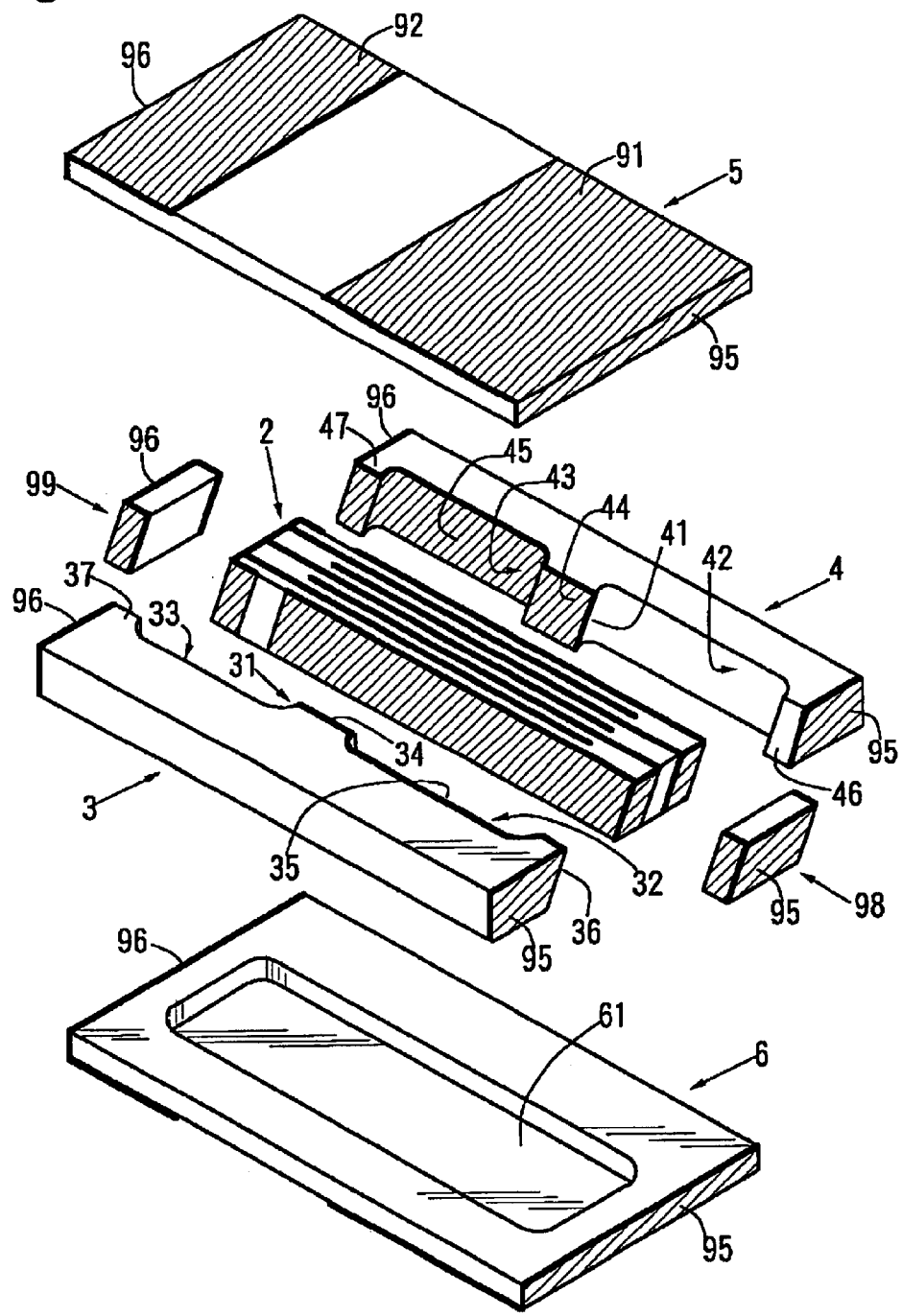
FIG. 1 is an exploded perspective view of a first embodiment of the piezoelectric sensor in accordance with the present invention.
Figure 2:
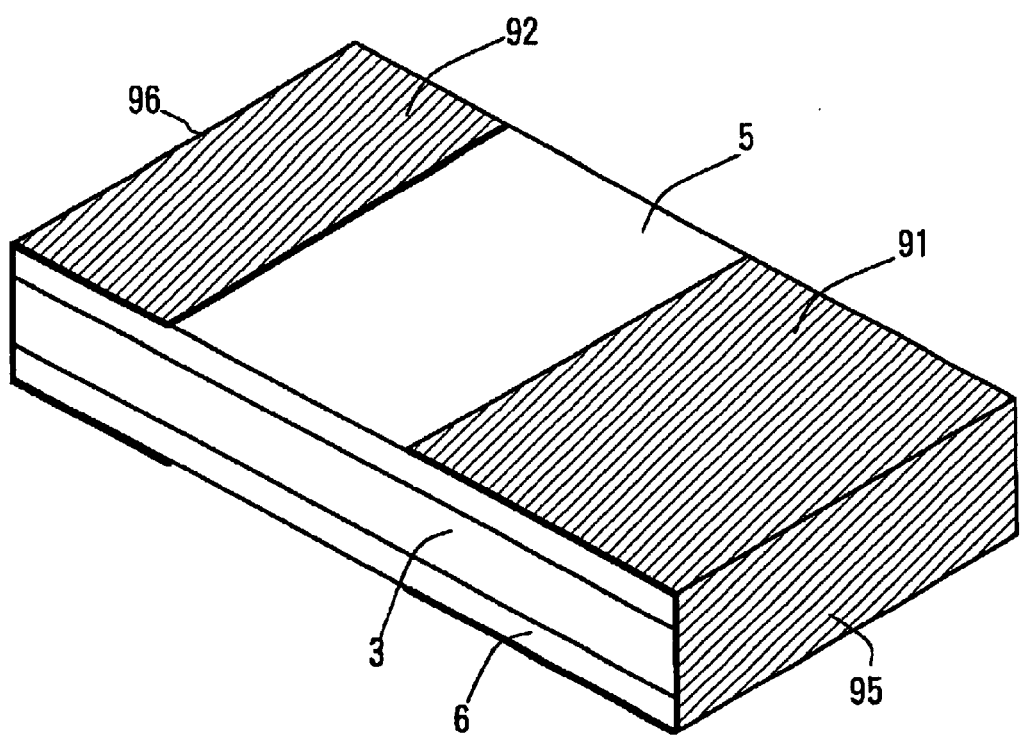
FIG. 2 is a perspective view showing the exterior of the piezoelectric sensor shown in FIG. 1.
Figure 3:
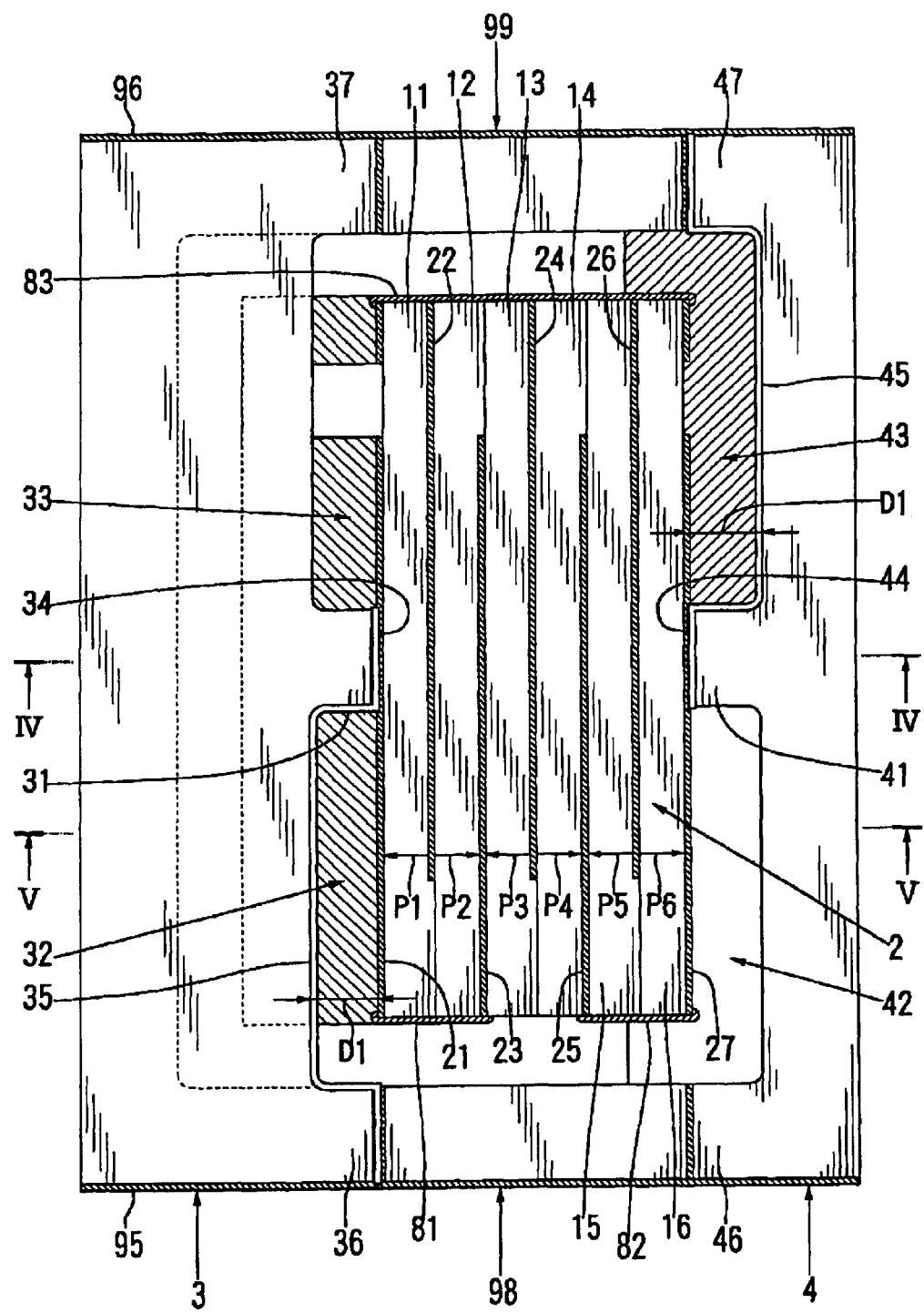
FIG. 3 is a plan view omitting a lid member in the piezoelectric sensor shown in FIGS. 1 and 2.
Figure 4:
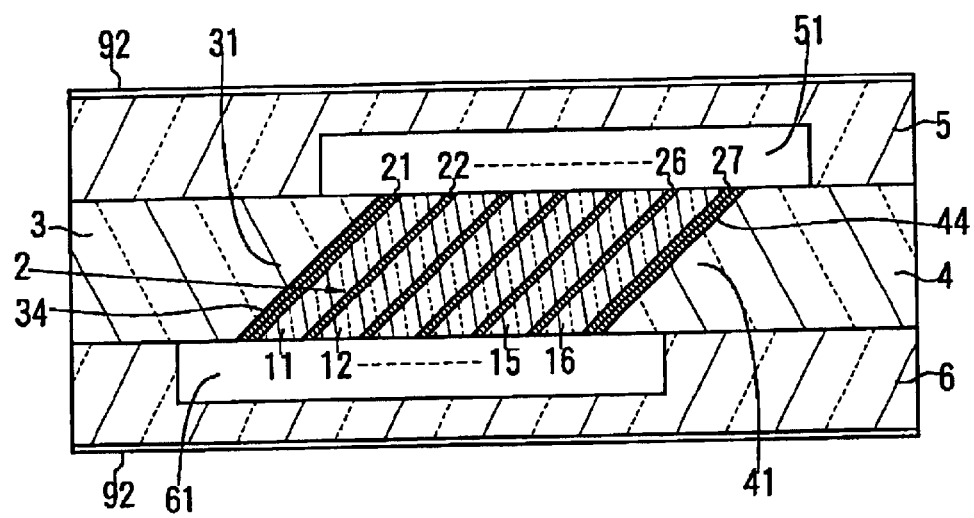
FIG. 4 is a sectional view taken along the line IV—IV of FIG. 3.
Figure 5:
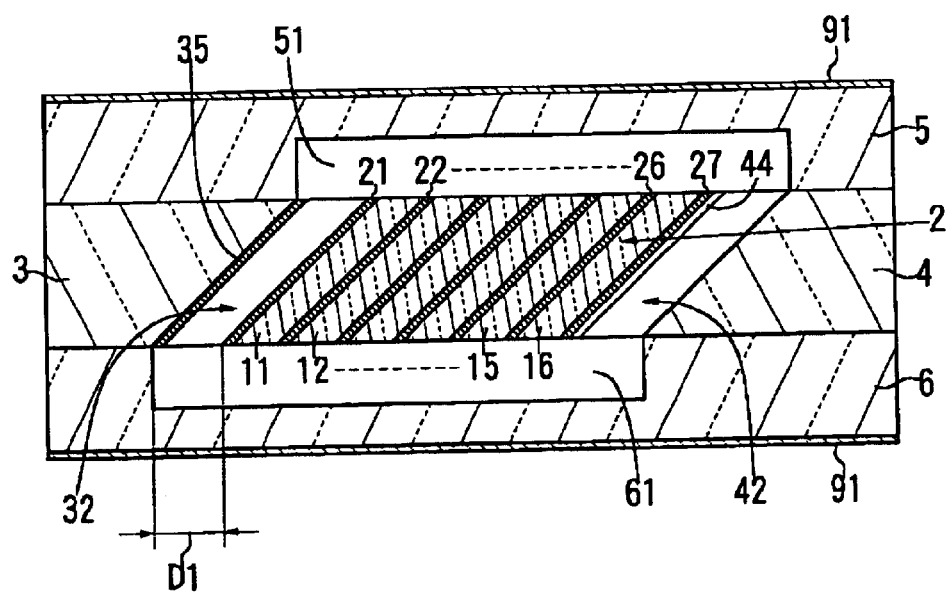
FIG. 5 is a sectional view taken along the line V—V of FIG. 3.

FIG. 1 is an exploded perspective view showing an embodiment of the piezoelectric sensor in accordance with the present invention. FIG. 2 is a perspective view showing the exterior of the piezoelectric sensor shown in FIG. 1. FIG. 3 is a plan view omitting a lid member in the piezoelectric sensor shown in FIGS. 1 and 2. FIG. 4 is a sectional view taken along the line IV—IV of FIG. 3. FIG. 5 is a sectional view taken along the line V—V of FIG. 3. As depicted, the piezoelectric sensor in accordance with this embodiment includes a piezoelectric device 2, a first support member 3, and a second support member 4.

First, referring to FIGS. 1, 3, and 4, the piezoelectric device 2 includes piezoelectric ceramic layers 11 to 16 and electrode films 21 to 27, and extends longitudinally with a predetermined width. The piezoelectric ceramic layers 11 to 16 have a number of at least 4 and are alternately laminated with the electrode films 22 to 26. The number of piezoelectric ceramic layers 11 to 16 is 6 in this embodiment. The piezoelectric ceramic layers 11 to 16 are constituted, for example, by a material such as lead zirconate titanate.

Among the electrode films 21 to 27, the electrode films 22 to 26 are disposed between piezoelectric ceramic layers 11 to 16. Specifically, the electrode films 22 to 26 are disposed at respective interfaces (11, 12) to (15, 16) of the piezoelectric ceramic layers adjacent each other. The other electrode films 21, 27 are disposed on both outer faces of the laminate formed by the piezoelectric ceramic layers 11 to 16, respectively.

Further, referring to FIG. 3, polarization directions P1 to P6 are set in the piezoelectric ceramic layers 11 to 16, respectively. The polarization direction P1 of the piezoelectric ceramic layer 11 is from the electrode film 22 to the electrode film 21. The polarization direction P2 of the piezoelectric ceramic layer 12 is from the electrode film 22 to the electrode film 23. The polarization direction P3 of the piezoelectric ceramic layer 13 is from the electrode film 24 to the electrode film 23. The polarization direction P4 of the piezoelectric ceramic layer 14 is from the electrode film 24 to the electrode film 25. The polarization direction P5 of the piezoelectric ceramic layer 15 is from the electrode film 26 to the electrode film 25. The polarization direction P6 of the piezoelectric ceramic layer 16 is from the electrode film 26 to the electrode film 27.

The laminate formed by the piezoelectric ceramic layers 11 to 16 is further provided with connecting conductors 81 to 83. Specifically, the connecting conductors 81, 82 are disposed at one longitudinal end face of the laminate, whereas the connecting conductor 83 is disposed at the other end face of the laminate. The electrode films 21, 23 are connected to each other by way of the connecting conductor 81. Similarly, the electrode films 25, 27 are connected to each other by way of the connecting conductor 82, whereas the electrode films 22, 24, 26 are connected to each other by way of the connecting conductor 83.

Referring to FIGS. 1 and 3 to 5, the first support member 3 has a first projection 31. The first projection 31 is disposed at a longitudinally intermediate part. The first support member 3 further comprises first depressions 32, 33 extending longitudinally on both sides of the first projection 31, respectively. The first support member 3 can be constituted by electrically insulating ceramics, plastics, or the like. Examples of usable materials include ceramics such as forsterite, cordierite, and magnesium titanate, and resins having thermal resistance such as liquid crystal polymers.

The first support member 3 further comprises a first contact electrode 34 and a first lead electrode 35. The first contact electrode 34 is disposed at the end face of first projection 31 opposed to the piezoelectric device 2. The first lead electrode 35 is provided on the surface of the first support member 3, specifically, on the bottom face of the first depression 32, and is electrically connected to the first contact electrode 34. The first contact electrode 34 and first lead electrode 35 are formed by printing, sputtering, vapor deposition, plating, or the like.

As with the first support member 3, the second support member 4 has a second projection 41. The second projection 41 is disposed at a longitudinally intermediate part. The second support member 4 further comprises second depressions 42, 43 extending longitudinally on both sides of the second projection 41, respectively. The second support member 4 can be constituted by a material similar to that of the first support member 3.

The second support member 4 also comprises a second contact electrode 44 and a second lead electrode 45. The second contact electrode 44 is disposed at the end face of second projection 41 opposed to the piezoelectric device 2. The second lead electrode 45 is provided on the surface of the second support member 4, specifically, on the bottom face of the second depression 43, and is electrically connected to the second contact electrode 44. The second contact electrode 44 and second lead electrode 45 are also formed by printing, sputtering, vapor deposition, plating, or the like.

The first support member 3 and second support member 4 are arranged such that the first projection 31 and second projection 41 are opposed to each other with a gap therebetween. Also, the first support member 3 and second support member 4 are longitudinally aligned with each other. Further, in the first support member 3 and second support member 4, the first depression 32 and second depression 42 are opposed to each other with a gap therebetween. Similarly, another first depression 33 and another second depression 43 are opposed to each other with a gap therebetween.

Referring to FIGS. 3 to 5, the piezoelectric device 2 is disposed between the first projection 31 and second projection 41, and is held by the end faces of the first and second projections 31, 41. Specifically, the piezoelectric device 2 is arranged between the first projection 31 and second projection 41 while longitudinally aligning with the first support member 3 and second supporting member 4, and is held by the end faces of the first and second projections 31, 41 at its longitudinally intermediate part. Both longitudinal end parts of the piezoelectric device 2 are free ends.

In this embodiment, the end face of the first projection 31 is provided with the first contact electrode 34, whereas the end face of the second projection 41 is provided with the second contact electrode 44. As a consequence, the above-mentioned holding electrically connects the electrode films 21, 27 on both outer faces of the laminate to the first and second contact electrodes 34, 44 (see FIGS. 3 and 4). The electrode films 21, 27 of the piezoelectric device 2 are bonded to the first and second contact electrodes 34, 44, respectively, with an electrically conductive adhesive or the like.

The piezoelectric device 2 is arranged with a gap D1 from the bottom faces of the first and second depressions (32, 33), (42, 43) throughout its length (excluding the region held by the first projection 31 and second projection 41). The gap D1 is defined by the depth from the end face of the first projection 31 to the bottom face of the first depressions 32, 33 and the depth from the end face of second first projection 41 to the bottom face of the second depressions 42, 43.

Here, the gap D1 is set to such a size that the piezoelectric device 2 will not break even if a longitudinal end part of the piezoelectric device 2 deforms to a position in contact with the bottom face of the first depressions 32, 33 or the bottom face of the second depressions 42, 43. The size of gap D1 changes depending on the length of the piezoelectric device 2. Preferably, the gap D1 is made greater as the piezoelectric device 2 is longer.

In this embodiment, the end faces of the first projection 31 and second projection 41 are slopes which are parallel to each other and inclined in the same direction (see FIG. 4). Therefore, the piezoelectric device 2 is arranged oblique. The bottom face of the first depressions 32, 33 and the bottom face of the second depressions 42, 43 are slopes inclined in the same direction as that of the end faces of the first projection 31 and second projection 41. As a consequence, the piezoelectric device 2 is arranged with the gap D1 from the bottom face of the first depressions 32, 33 and the bottom face of the second depressions 42, 43 throughout its length.

Unlike this embodiment, the end faces of the first projection 31 and second projection 41 may be vertical surfaces which are parallel to each other. In this case, the piezoelectric device 2 is arranged substantially vertical. Also, the bottom face of the first depressions 32, 33 and the bottom face of the second depressions 42, 43 become vertical surfaces parallel to the end faces of the first projection 31 and second projection 41.

Further, referring to FIGS. 1, 2, and 4, the depicted piezoelectric sensor includes a first lid member 5 and a second lid member 6. The first and second lid members 5, 6 secure a space for vibrating the piezoelectric device 2, and are respectively arranged on both sides of the assembly constituted by the piezoelectric device 2, first support member 3, and second support member 4 orthogonal to the assembling direction thereof. The first and second lid members 5, 6 have depressions 51, 61 for securing vibration spaces for the piezoelectric device 2, respectively. The first and second lid members 5, 6 can be constituted by materials similar to those of the first and second support members 3, 4, e.g., ceramics such as forsterite, cordierite, and magnesium titanate, and resins having thermal resistance such as liquid crystal polymers. The first and second lid members 5, 6 are bonded to both sides of the first support member 3 and second support member 4 in the thickness direction thereof with an electrically nonconductive adhesive, respectively.

On the surface of each of the first and second lid members 5, 6, two terminal electrodes 91, 92 are disposed. One terminal electrode 91 is electrically connected to the first lead electrode 35 by way of a side electrode 95. The other terminal electrode 92 is electrically connected to the second lead electrode 45 by way of a side electrode 96.

Further, referring to FIGS. 1 and 3, the depicted piezoelectric sensor includes a first spacer 98 and a second spacer 99. The first spacer 98 and second spacer 99 fill the respective gaps formed between the first support member 3 and second support member 4 on both longitudinal end sides thereof. In this embodiment, the first support member 3 has projections 36, 37, flush with the end face of the first projection 31, at both longitudinal end parts thereof, respectively; whereas the second support member 4 has projections 46, 47, flush with the end face of the second first projection 41, at both longitudinal end parts thereof, respectively. Hence, as the first spacer 98 and second spacer 99, those having the structure and thickness identical to those of the piezoelectric device 2 are used. The first spacer 98 and second spacer 99 are bonded to the projections 36, 37 of the first support member 3 and the projections 46, 47 of the second support member 4 with an electrically conductive or nonconductive adhesive.

Further, the first spacer 98 has an electrode (conductor) provided on its surface, by which the first lead electrode 35 is electrically connected to the side electrode 95 (see FIG. 3). Similarly, the second spacer 99 has an electrode (conductor) provided on its surface, by which the second lead electrode 45 is electrically connected to the side electrode 96.

In the piezoelectric sensor of this embodiment, as mentioned above, the first support member 3 and second support member 4 are arranged such that the first projection 31 and second projection 41 are opposed to each other with a gap therebetween. The piezoelectric device 2 is disposed between the first projection 31 and second projection 41, and is held by the end faces of the first and second projections 31, 41. As a consequence, when an exciting force, a shock, or the like is applied, a portion of the piezoelectric device 2 near its part held by the first and second projections 31, 41 deforms in response to the exciting force, thereby generating a detection signal.

In the piezoelectric device 2, as an important feature of this embodiment, at least four piezoelectric ceramic layers 11 to 16 are alternately laminated with the electrode films 22 to 26. Using such four or more piezoelectric ceramic layers 11 to 16 can secure a large electrostatic capacity, thereby allowing electric charge sensitivity to improve.

Also, using four or more piezoelectric ceramic layers 11 to 16 can secure a large electrostatic capacity without increasing the size of the piezoelectric device 2. Therefore, the piezoelectric sensor incorporating the piezoelectric device 2 therein can be kept from becoming greater, and the piezoelectric sensor can be made smaller. On the other hand, since at least four piezoelectric ceramic layers are provided, the thickness can be increased, so as to attain a higher strength.

In this embodiment, the piezoelectric device 2 is held by the end faces of the first and second projections 31, 41 at its longitudinally intermediate part. Therefore, when an exciting force, a shock, or the like is applied to the piezoelectric device 2, parts on both sides of the intermediate part held by the first and second projections 31, 41 deform in response to the exciting force, thereby outputting a detection signal.

Specifically, the first projection 31 is disposed at a longitudinally intermediate part of the first support member 3, and the second projection 41 is also disposed at a longitudinally intermediate part of the second support member 4. The piezoelectric device 2 is disposed between the first and second projections 31, 41 while longitudinally aligning with the first and second support members 3, 4. This can easily attain a structure in which the longitudinally intermediate part of the piezoelectric device 2 is held by the first and second projections 31, 41.

Further, in this embodiment, the first support member 3 has first depressions 32, 33 longitudinally extending on both sides of the first projection 31. Similarly, the second support member 4 has second depressions 42, 43 longitudinally extending on both sides of the second projection 41. Therefore, as shown in FIGS. 3 and 5, the piezoelectric device 2 can be arranged with the gap D1 from the bottom face of the first and second depressions (32, 33), (42, 43) over substantially the whole length thereof. As a consequence, the piezoelectric device 2 can secure a space for deforming the parts on both side of the intermediate part held by the first and second projections 31, 41.

Here, the gap D1 is set to such a size that the piezoelectric device 2 will not break even if a longitudinal end part of the piezoelectric device 2 deforms to a position in contact with the bottom face of the first depressions 32, 33 or the bottom face of the second depressions 42, 43. Therefore, when the piezoelectric device 2 is deformed in response to an excessive exciting force or an impact force, its longitudinal end part comes into contact with the bottom face of the first depressions 32, 33 or the bottom face of the second depressions 42, 43 before the piezoelectric device 2 breaks. The piezoelectric device 2 cannot deform more. As a consequence, the piezoelectric device 2 is reliably protected against breaking, chipping, or cracking.

When the respective end faces of the first projection 31 and second projection 41 are slopes which are parallel to each other and inclined in the same direction while the piezoelectric device 2 is arranged oblique, this embodiment can yield a piezoelectric sensor which can respond to bidirectional shocks and exciting forces.

Figure 6:
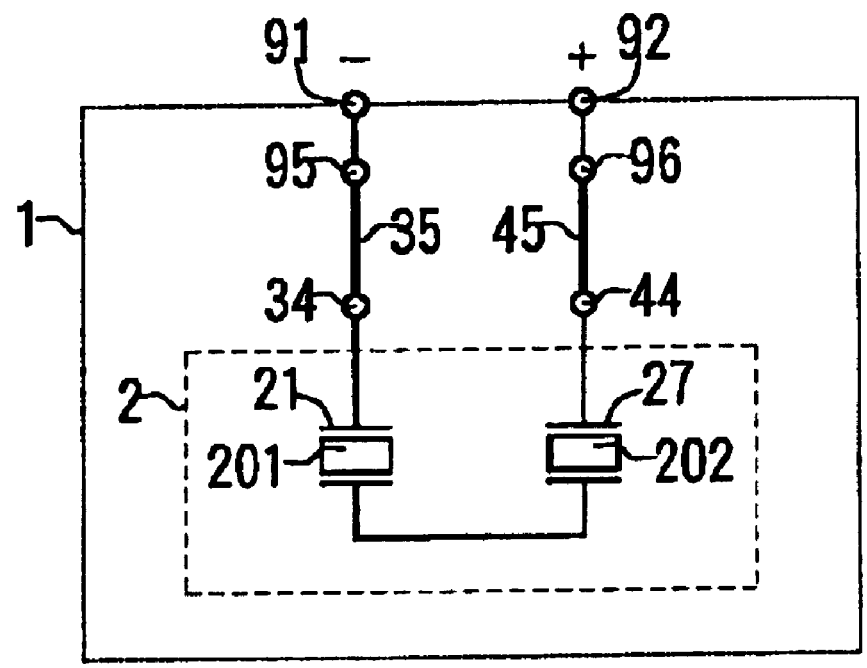
FIG. 6 is an equivalent circuit diagram of the piezoelectric sensor shown in FIGS. 1 to 5.

FIG. 6 is an equivalent circuit diagram of the piezoelectric sensor shown in FIGS. 1 to 5. In view of the equivalent circuit diagram, the piezoelectric device 2 of the piezoelectric sensor 1 includes a pair of piezoelectric devices 201, 202. One piezoelectric device 201 is constituted by the piezoelectric ceramic layers 11 to 13 and electrode films 21 to 24 included in the piezoelectric device 2 (see FIG. 3). The other piezoelectric device 202 is constituted by the piezoelectric ceramic layers 14 to 16 and electrode films 24 to 27 (see FIG. 3).

As explained with reference to FIGS. 1, 3, and 4, the first support member 3 comprises the first contact electrode 34 disposed at an end face of the first projection 31, whereas the second support member 4 comprises the second contact electrode 44 disposed at an end face of the second projection 41. In the piezoelectric device 2, the electrode films 21, 27 among the electrode films 21 to 27 are disposed on both outer faces of the laminate formed by the piezoelectric ceramic layers 11 to 16, and are electrically connected to the first and second contact electrodes 34, 44, respectively. In such a configuration, a detection signal generated in the piezoelectric device 2 at the time when an exciting force, a shock, or the like is applied thereto is taken from the electrode films 21, 27 on both outer faces to the outside by way of the first and second contact electrodes 34, 44 (see FIG. 6).

The first support member 3 further comprises the first lead electrode 35 on its surface, whereas the first lead electrode 35 is electrically connected to the first contact electrode 34. As a consequence, an electric path from the first contact electrode 34 to the outside is constructed easily (see FIG. 6). This embodiment constructs an electric path extending from the first contact electrode 34 to the terminal electrode 91 by way of the first lead electrode 35 and side electrode 95 in succession.

Similarly, the second support member 4 comprises the second lead electrode 45 on its surface, whereas the second lead electrode 45 is electrically connected to the second contact electrode 44, whereby an electric path from the second contact electrode 44 to the outside is constructed easily (see FIG. 6). This embodiment constructs an electric path extending from the second contact electrode 44 to the terminal electrode 92 by way of the second lead electrode 45 and side electrode 96 in succession.

With reference to FIGS. 7 to 13, a method of making the piezoelectric sensor shown in FIGS. 1 to 5 will now be explained.

Figure 7:
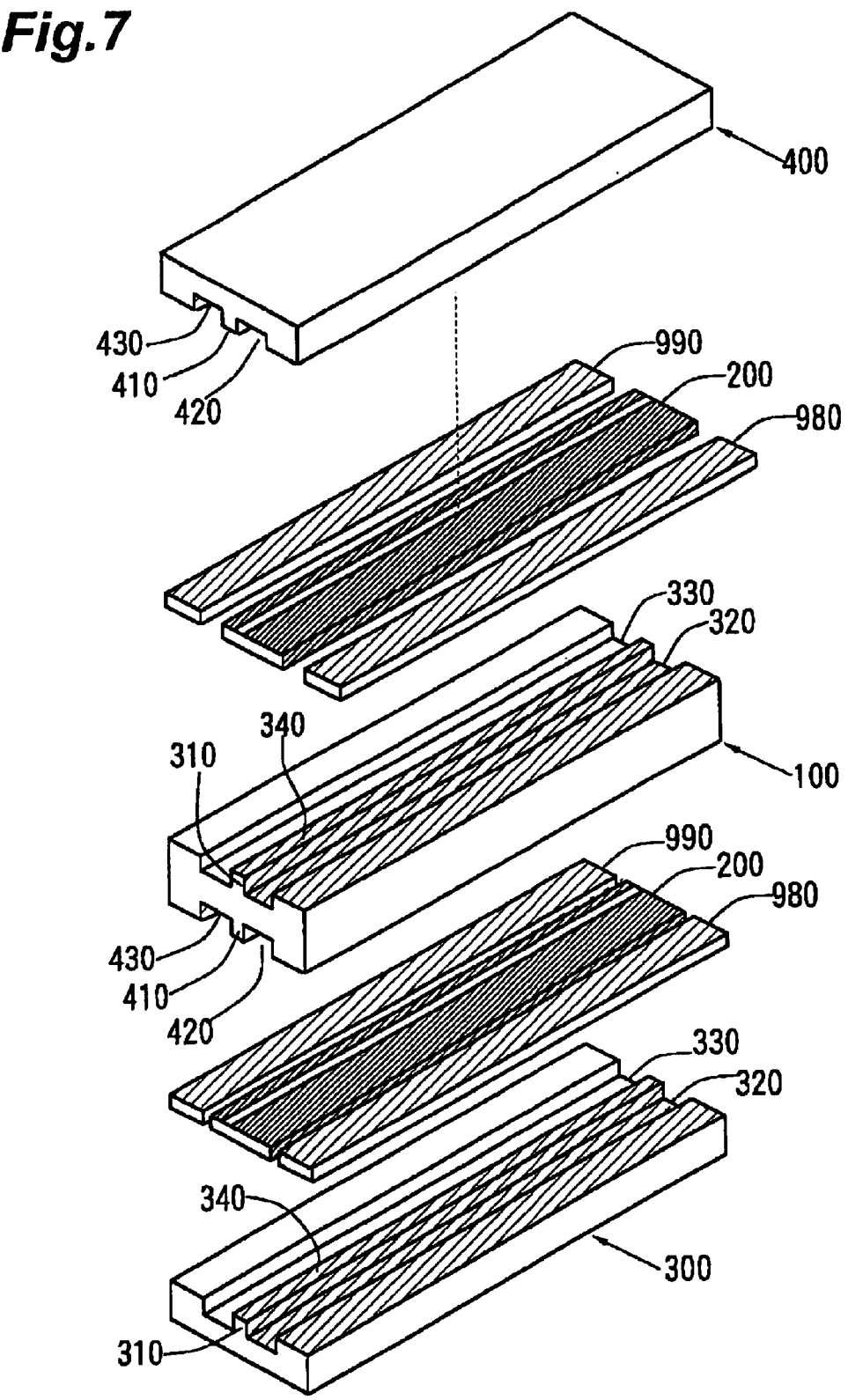
FIG. 7 is a view for explaining a method of making the piezoelectric sensor shown in FIGS. 1 to 5.

First, as shown in FIG. 7, a piezoelectric device member 200 and spacer members 980 and 990 are mounted on a lowermost support member 300. Subsequently, an operation of mounting an intermediate support member 100 on the piezoelectric device member 200 and spacer members 980, 990 and then mounting a piezoelectric device member 200 and spacer members 980, 990 thereon is carried out repeatedly. Finally, an uppermost support member 400 is mounted on the piezoelectric device member 200 and spacer members 980, 990. Their overlapping surfaces are bonded and secured to each other with a conductive adhesive. The lowermost support member 300, intermediate support member 100, uppermost support member 400, and piezoelectric device member 200 have such a length that a number of piezoelectric sensors can be taken out therefrom. As compared with FIGS. 1 to 5, for example, the lowermost support member 300 becomes the first support member 3 (see FIGS. 1 to 5), whereas the uppermost support member 400 becomes the second support member 4. The intermediate support member 100 is divided into the first support member 3 and second support member 4.

The upper side of the lowermost support member 300 for mounting the piezoelectric device member 200 and spacer members 980, 990 is formed with a first projection 310, whereas first depressions 320, 330 are formed on both sides of the first projection 310. Further, the surface of the first projection 310 is formed with a first contact electrode 340.

The lower side of the uppermost support member 400 overlapping the piezoelectric device member 200 and spacer members 980, 990 is formed with a second projection 410, whereas second depressions 420, 430 are formed on both sides of the second projection 410. Further, the surface of the second projection 410 is formed with a second contact electrode (not depicted).

Figure 8:
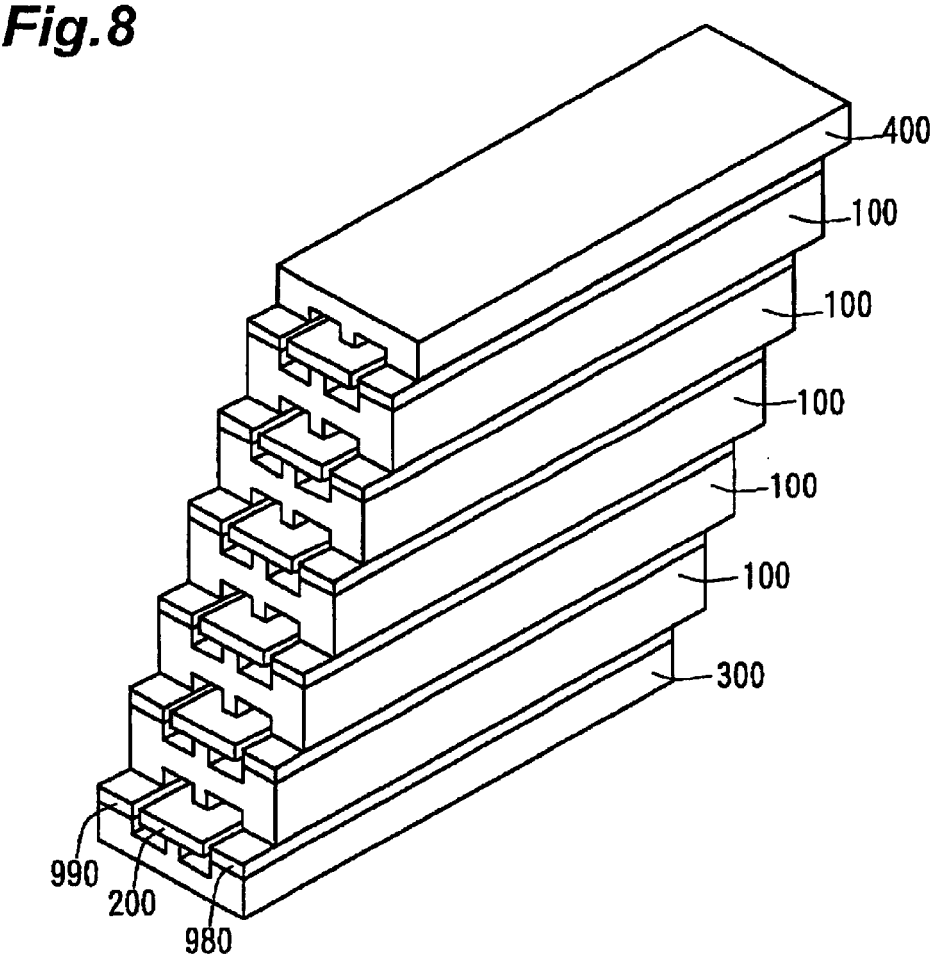
FIG. 8 is a view showing the laminate assembly obtained by way of the step shown in FIG. 7.

The intermediate member 100 is formed with a first projection 310 on the upper side thereof, whereas first depressions 320, 330 are formed on both sides of the first projection 310, respectively. Further, the surface of the first projection 310 is formed with a first contact electrode 340. The lower side of the intermediate support member 100 is formed with a second projection 410, whereas second depressions 420, 430 are formed on both sides of the second projection 410. Further, the surface of the second projection 410 is formed with a second contact electrode (not depicted). FIG. 8 is a perspective view of the laminate assembly obtained by way of the laminate assembling step shown in FIG. 7.

Figure 9:
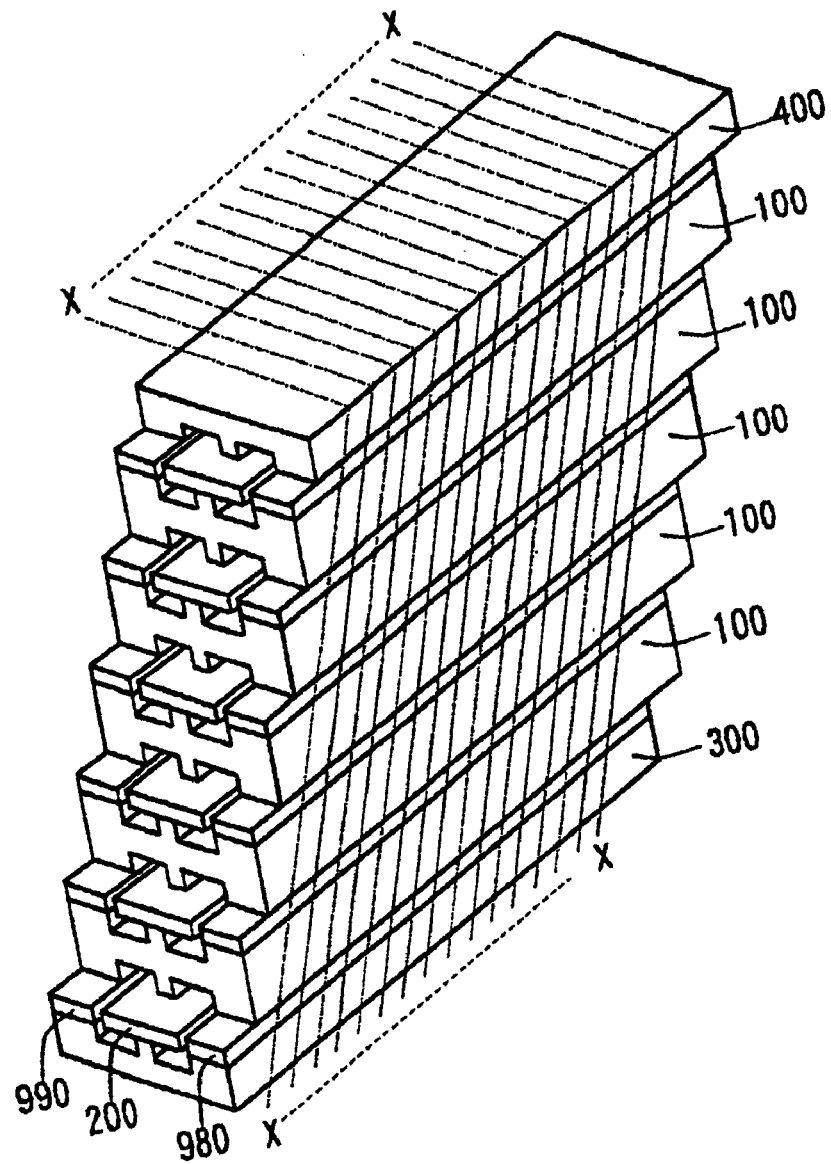
FIG. 9 is a view showing a step of cutting and dividing the laminate assembly shown in FIG. 8.
Figure 10:
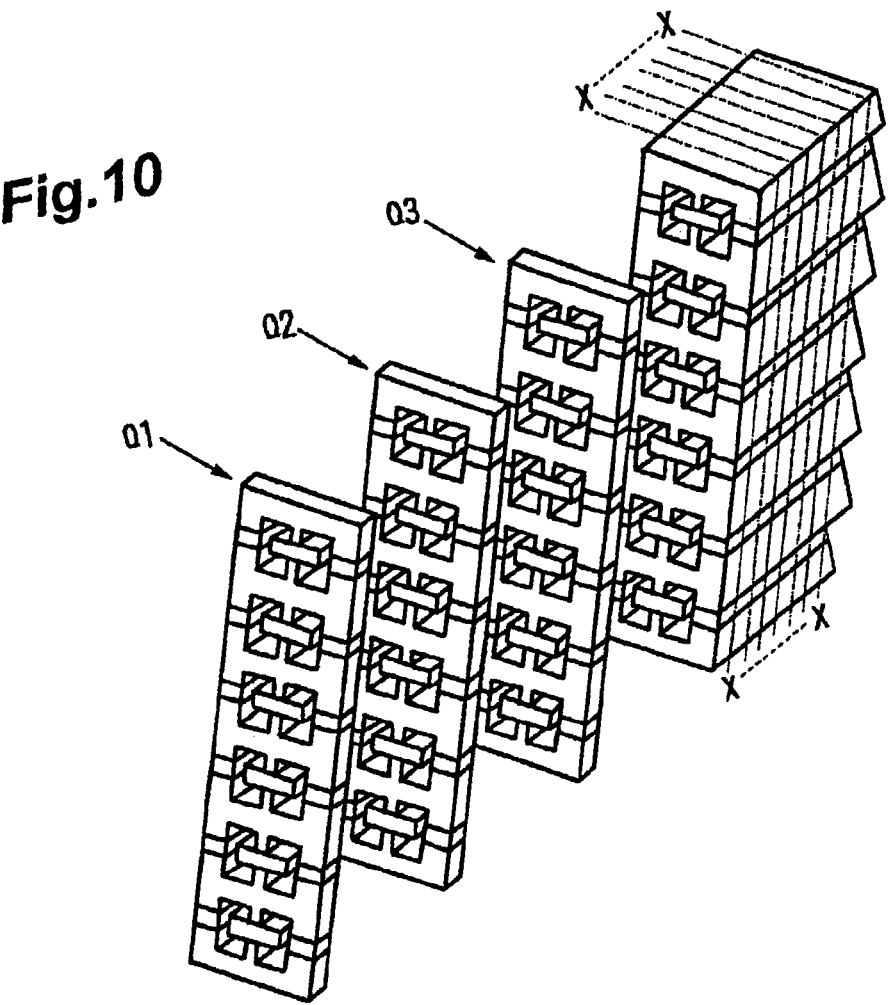
FIG. 10 is a view showing piezoelectric sensor assemblies obtained by way of the cutting and dividing step shown in FIG. 9.
Figure 11:
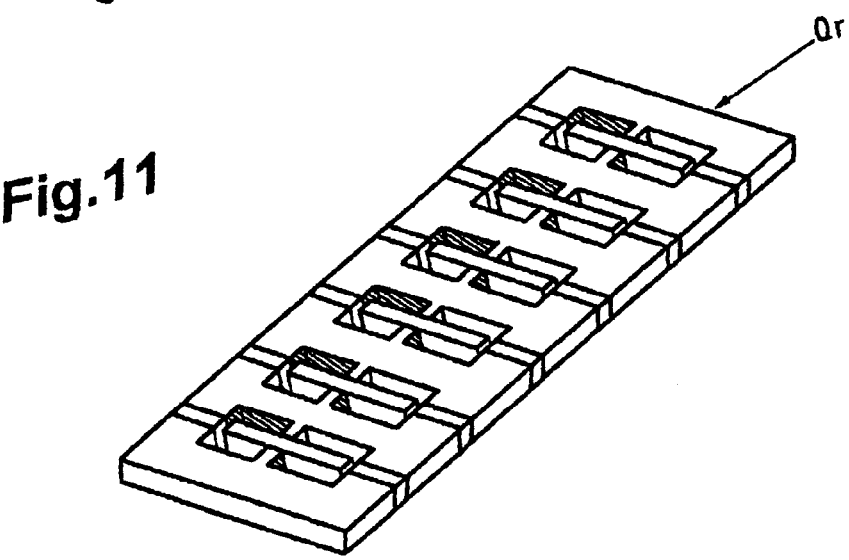
FIG. 11 is a view showing a piezoelectric sensor assembly obtained by way of the cutting and dividing steps shown in FIGS. 9 and 10.

Subsequently, as shown in FIG. 9, the laminate assembly shown in FIG. 8 is subjected to a cutting and dividing step. For cutting and dividing, the laminate assembly is finely divided in its longitudinal direction along cutting plane lines X-X. FIG. 10 shows piezoelectric sensor assemblies Q1 to Q3 obtained by way of the cutting and dividing step shown in FIG. 9, whereas FIG. 11 is a perspective view of a given piezoelectric sensor assembly Qr obtained.

Figure 12:
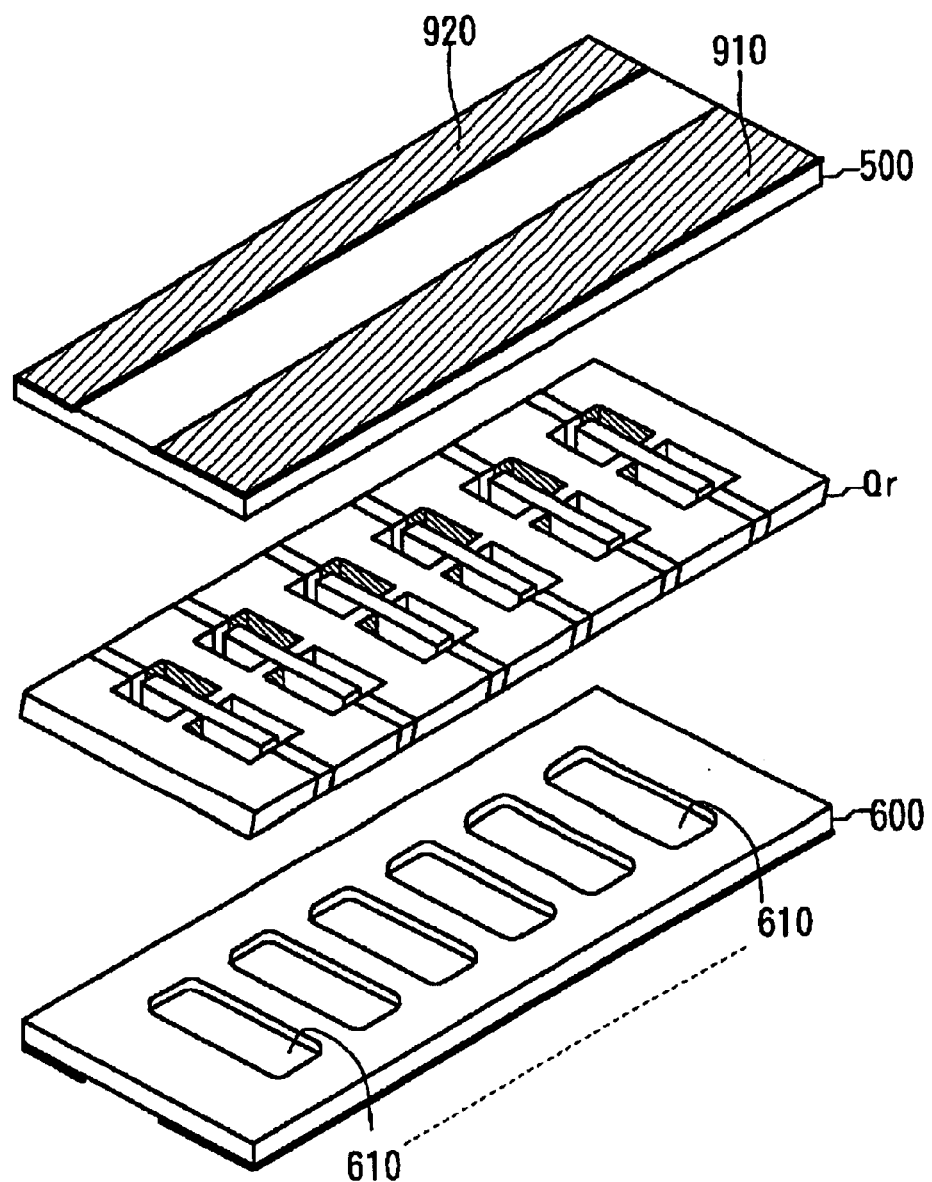
FIG. 12 shows a step subsequent to the steps shown in FIGS. 9 to 11.

Next, as shown in FIG. 12, a first lid member 500 and a second lid member 600 are bonded to both sides of the piezoelectric sensor assembly in the thickness direction. The upper face (in the drawing) of the first lid member 500 is formed with terminal electrodes 910, 920, whereas the lower face is formed with depressions (not depicted). The lower face (in the drawing) of the second lid member 600 is formed with terminal electrodes (not depicted), whereas the upper face is formed with depressions 610 at intervals therebetween. As a consequence, an assembly shown in FIG. 13 is obtained.

Figure 13:
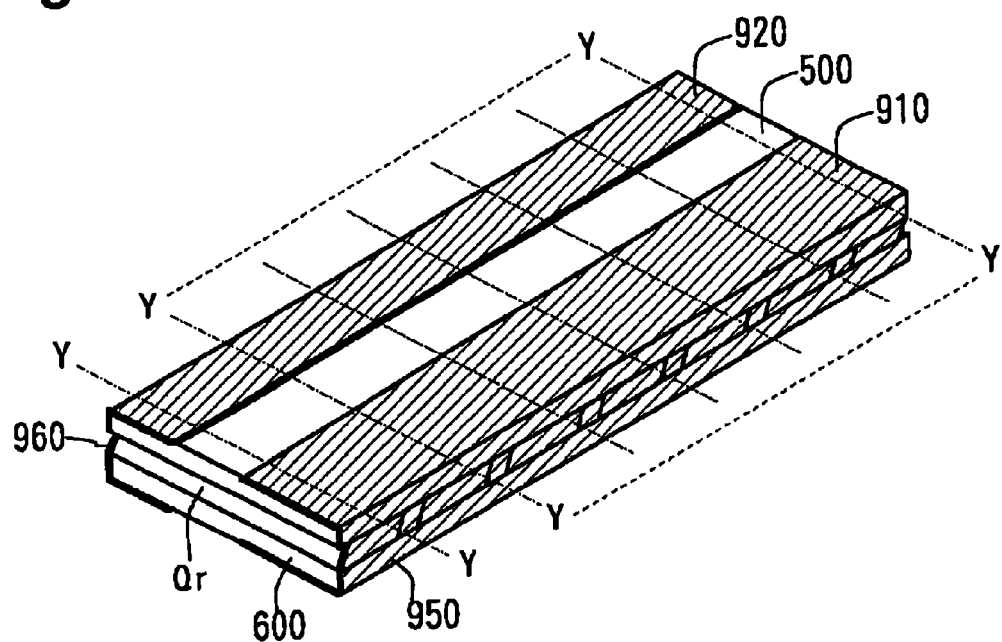
FIG. 13 is a view showing terminal electrode providing and cutting steps subsequent to the step shown in FIG. 12.

Subsequently, the assembly shown in FIG. 13 is provided with side electrodes 950, 960. The side electrodes 950, 960 are formed by such means as printing, sputtering, plating, and the like.

Then, as shown in FIG. 13, the laminate assembly is finely divided in its longitudinal direction along cutting plane lines Y-Y. This forms individual piezoelectric sensors. Thereafter, side electrodes and the like are provided, whereby the final product of piezoelectric sensor shown in FIGS. 1 to 5 is obtained.

Second Embodiment

Figure 14:
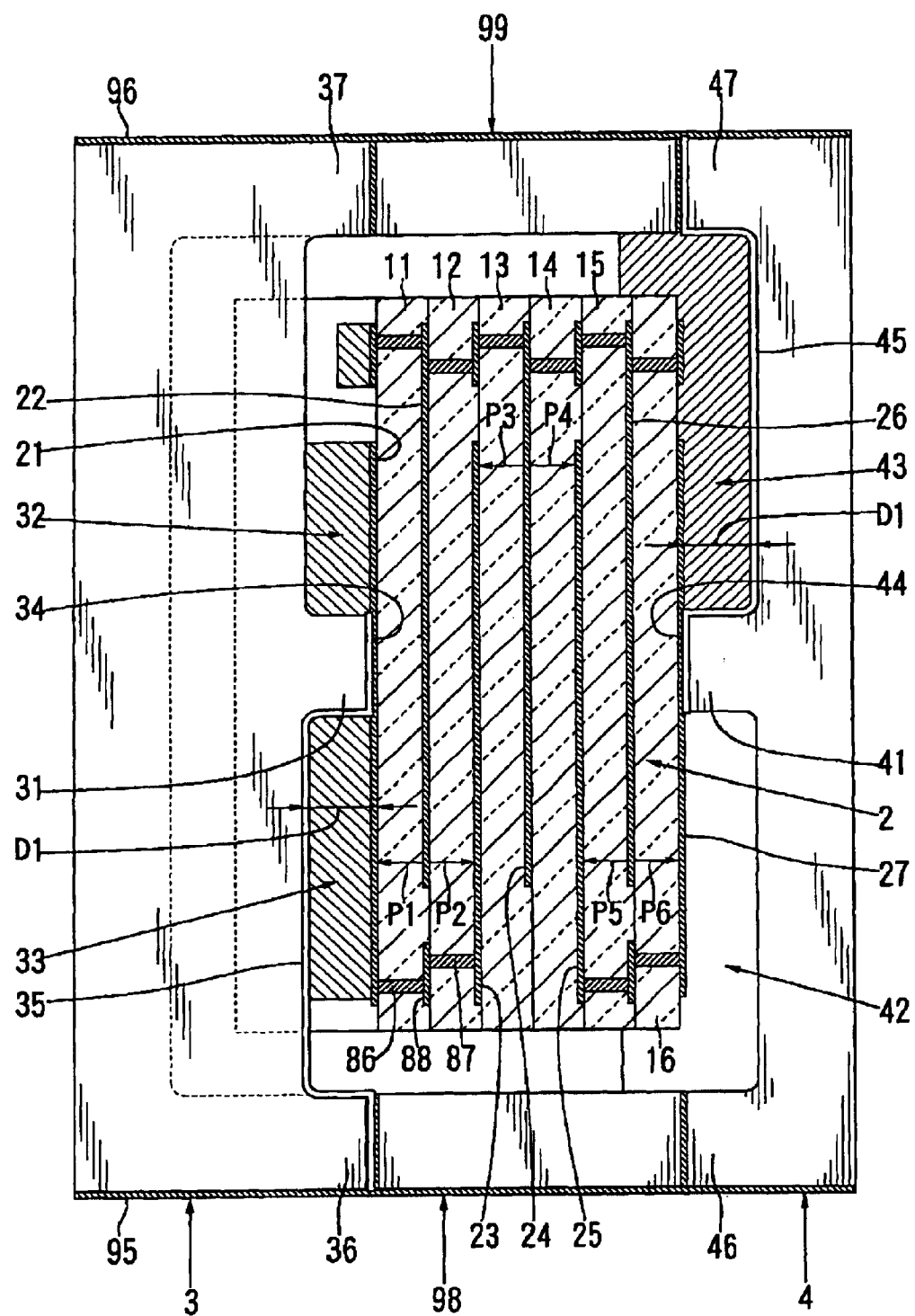
FIG. 14 is a partly sectional view showing a second embodiment of the piezoelectric sensor in accordance with the present invention.

With reference to FIG. 14, a second embodiment of the piezoelectric sensor in accordance with the present invention will now be explained. In the drawing, constituent parts substantially identical to those shown in FIGS. 1 to 5 will be referred to with numerals identical thereto, so as to omit their overlapping explanations as much as possible.

In this embodiment, the piezoelectric ceramic layers 11 to 16 are formed with through holes. For example, the piezoelectric ceramic layer 11 is formed with a thorough hole 86, whereas the piezoelectric ceramic layer 12 is formed with a through hole 87. The through hole 86 of the piezoelectric ceramic layer 11 can be formed when a penetrating hole of the piezoelectric ceramic layer 11 is filled with a conductive material. Here, a conductor film 88 is provided between the piezoelectric ceramic layers 11, 12, whereby the through hole 86 of the piezoelectric ceramic layer 11 and the through hole 87 of the piezoelectric ceramic layer 12 are connected to each other by way of the conductor film 88.

Some of the electrode films 21 to 27 are connected to each other by way of the through holes formed in the piezoelectric ceramic layers 11 to 16. For example, the electrode films 21, 23 are connected to each other by way of the through hole 86 of the piezoelectric ceramic layer 11 and the through hole 87 of the piezoelectric ceramic layer 12. Similarly, the electrode films 25, 27 are connected to each other by way of the through holes formed in the piezoelectric ceramic layers 15, 16, whereas the electrode films 22, 24, 26 are connected to each other through the through holes formed in the piezoelectric ceramic layers 11 to 16.

In the piezoelectric device 2, as mentioned above, some of the electrode films 21 to 27 are connected to each other by way of the through holes formed in the piezoelectric ceramic layers 11 to 16. Utilizing such through holes can easily realize complicated interlayer connections between the electrode films 21 to 26.

Third Embodiment

Figure 15:
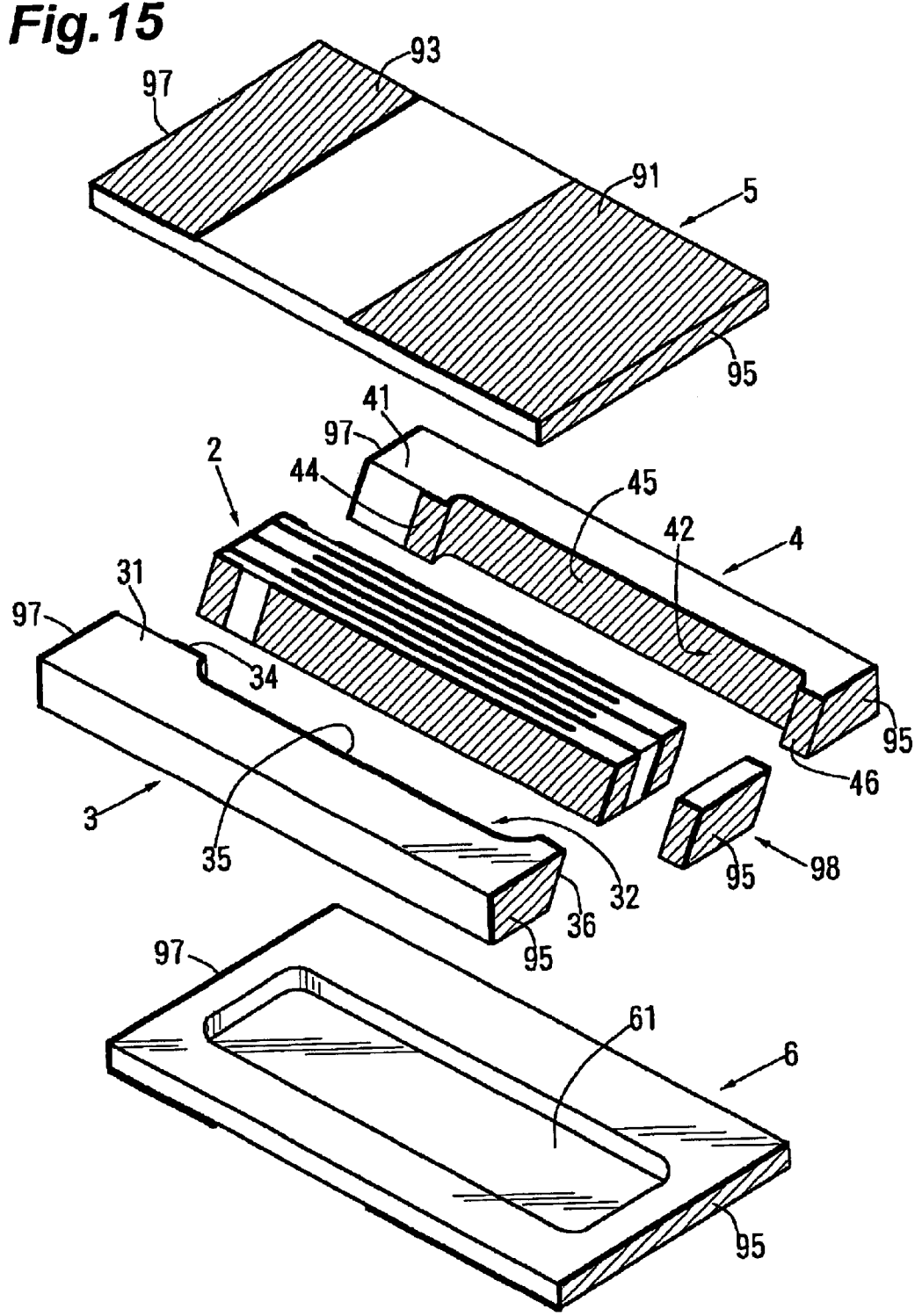
FIG. 15 is an exploded perspective view showing a third embodiment of the piezoelectric sensor in accordance with the present invention.
Figure 16:
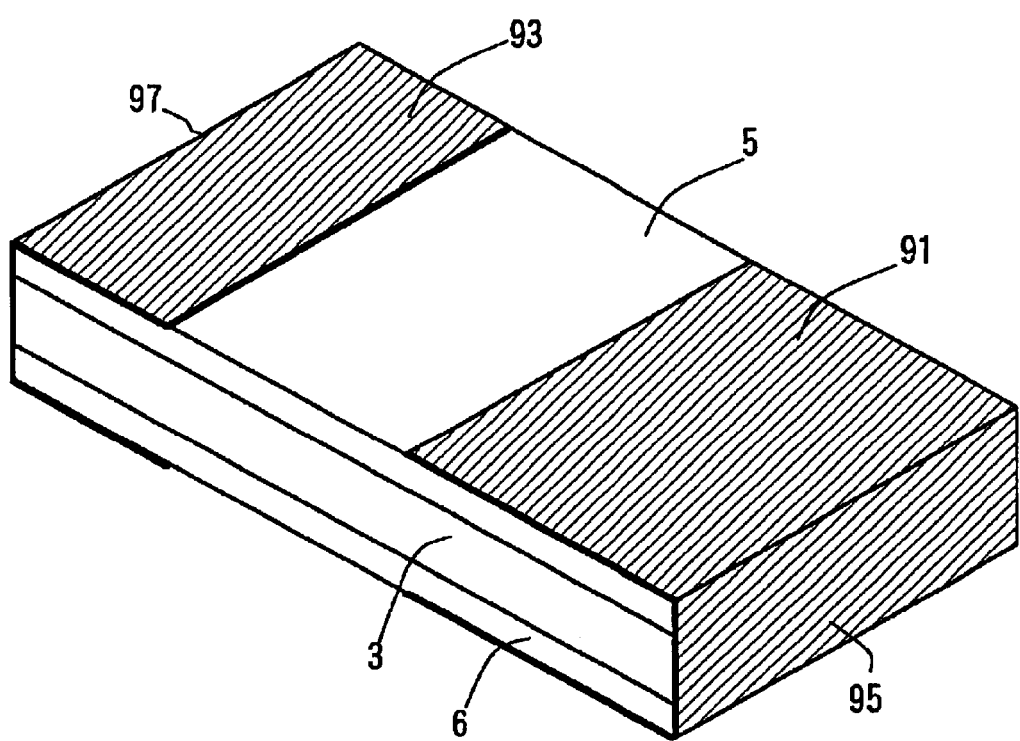
FIG. 16 is a perspective view showing the exterior of the piezoelectric sensor shown in FIG. 15.
Figure 17:
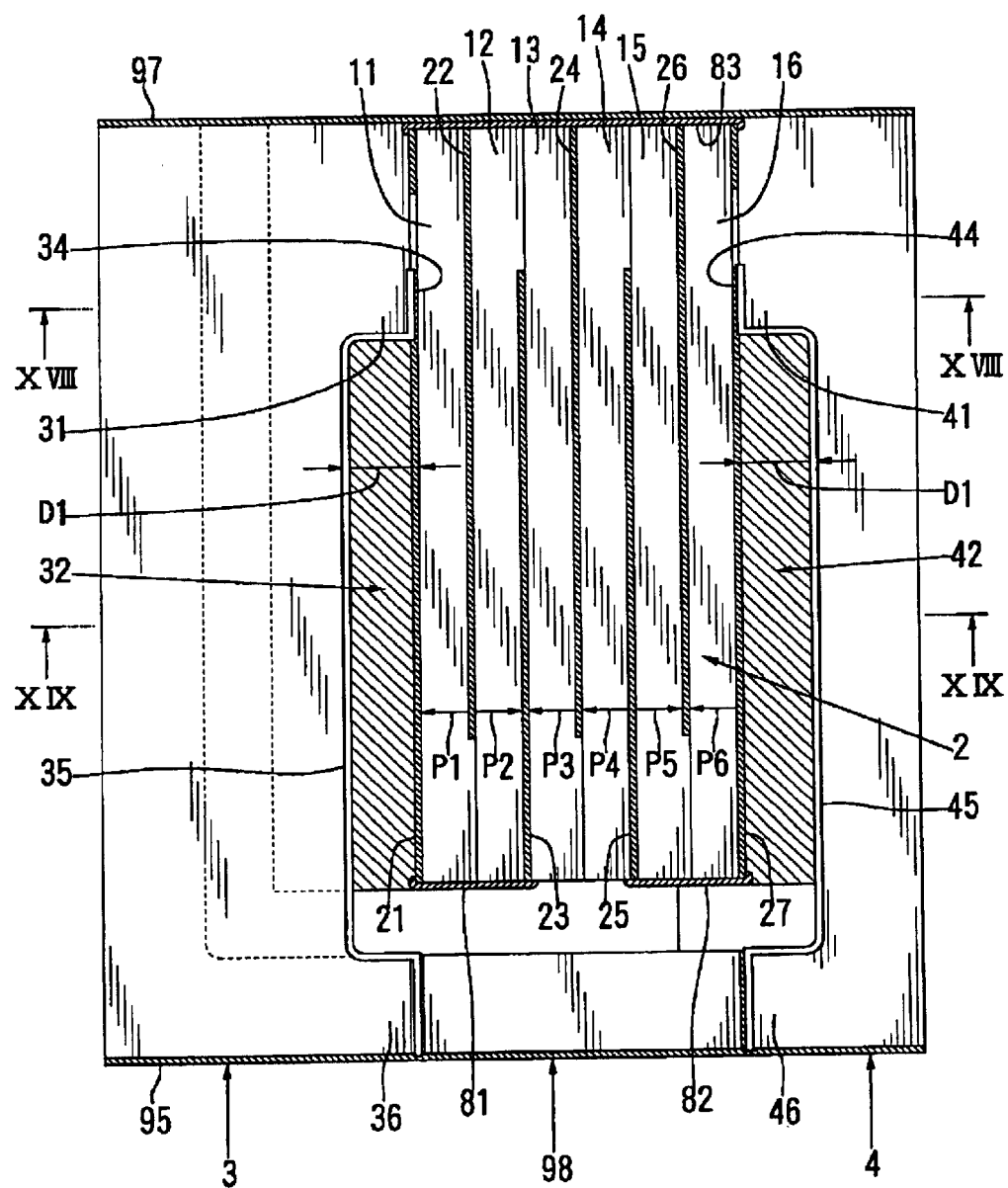
FIG. 17 is a plan view omitting a lid member in the piezoelectric sensor shown in FIGS. 15 and 16.
Figure 18:
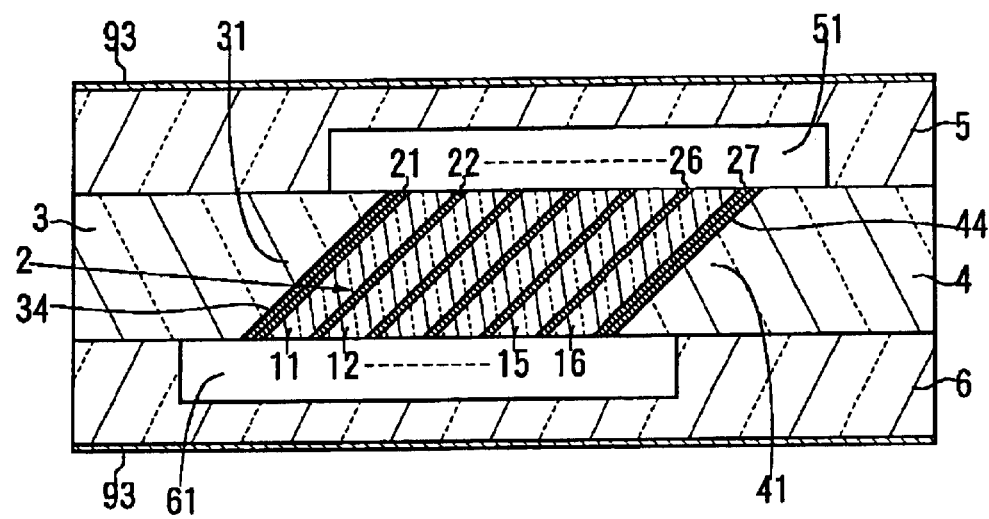
FIG. 18 is a sectional view taken along the line XVIII—XVIII of FIG. 17.
Figure 19:
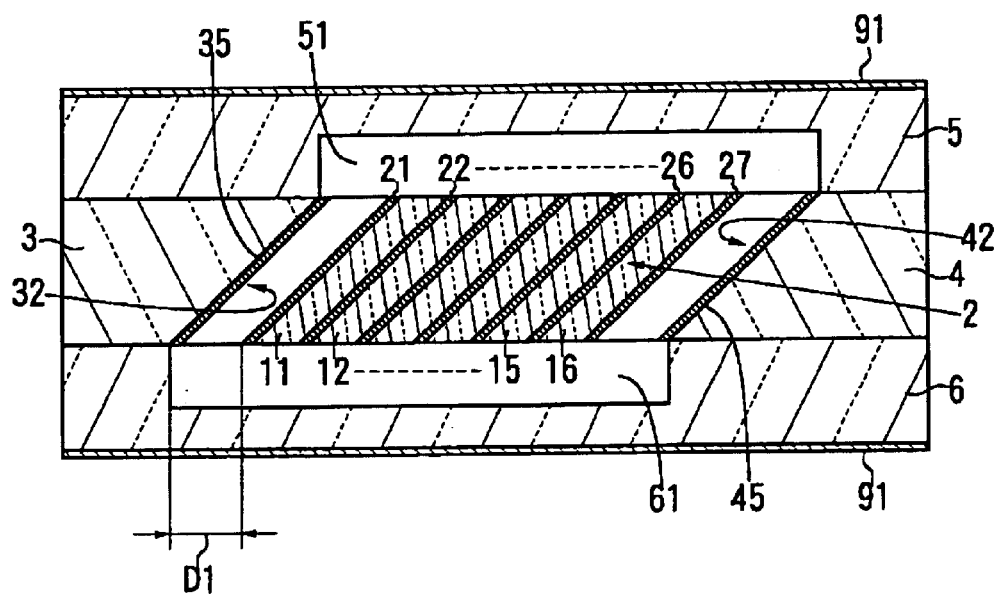
FIG. 19 is a sectional view taken along the line XIX—XIX of FIG. 17.

With reference to FIGS. 15 to 22, a third embodiment of the piezoelectric sensor in accordance with the present invention will now be explained. FIG. 15 is an exploded perspective view showing the piezoelectric sensor in accordance with this embodiment. FIG. 16 is a perspective view showing the exterior of the piezoelectric sensor shown in FIG. 15. FIG. 17 is a plan view omitting a lid member in the piezoelectric sensor shown in FIGS. 15 and 16. FIG. 18 is a sectional view taken along the line XVIII—XVIII of FIG. 17. FIG. 19 is a sectional view taken along the line XIX—XIX of FIG. 17. In the drawings, constituent parts substantially identical to those shown in FIGS. 1 to 5 are referred to with numerals identical thereto, so as to omit their overlapping explanations as much as possible.

First, referring to FIG. 17, the polarization direction Pi of the piezoelectric ceramic layer 11 in the depicted piezoelectric device 2 is from the electrode film 22 to the electrode film 21. The polarization direction P2 of the piezoelectric ceramic layer 12 is from the electrode film 22 to the electrode film 23. The polarization direction P3 of the piezoelectric ceramic layer 13 is from the electrode film 24 to the electrode film 23. The polarization direction P4 of the piezoelectric ceramic layer 14 is from the electrode film 25 to the electrode film 24. The polarization direction P5 of the piezoelectric ceramic layer 15 is from the electrode film 25 to the electrode film 26. The polarization direction P6 of the piezoelectric ceramic layer 16 is from the electrode film 27 to the electrode film 26.

Next, referring to FIGS. 15 and 17 to 19, the depicted first support member 3 is provided with a first projection 31 at one longitudinal end part thereof. A first depression 32 longitudinally extends from the first projection 31. A first contact electrode 34 is provided at the end face of first projection 31 opposed to the piezoelectric device 2. A first lead electrode 35 is provided on the surface of the first support member 3, specifically, on the bottom face of the first depression 32, and is electrically connected to the first contact electrode 34.

The depicted second support member 4 is provided with a second projection 41 at one longitudinal end thereof. A second depression 42 longitudinally extends from the second projection 41. A second contact electrode 44 is provided at the end face of second projection 41 opposed to the piezoelectric device 2. A second lead electrode 45 is provided on the surface of the second support member 4, specifically, on the bottom face of the second depression 42, and is electrically connected to the second contact electrode 44.

The first support member 3 and second support member 4 are arranged such that the first projection 31 and second projection 41 are opposed to each other with a gap therebetween in this embodiment as well. Also, the first support member 3 and second support member 4 longitudinally align with each other.

Referring to FIGS. 17 to 19, the piezoelectric device 2 is disposed between the first projection 31 and second projection 41 while longitudinally aligning with the first support member 3 and second support member 4.

Here, in this embodiment, one longitudinal end part of the piezoelectric device 2 is held by the end faces of the first and second projections 31, 41. The other longitudinal end part of the piezoelectric device 2 is a free end.

The end faces of the first projection 31 and second projection 41 are provided with a first contact electrode 34 and a second contact electrode 44, respectively, in this embodiment as well, whereby the electrode films 21, 27 on both outer faces of the laminate are electrically connected to the first and second contact electrodes 34, 44, respectively, by the holding (see FIGS. 17 and 18).

Further, the piezoelectric device 2 is arranged with a gap D1 from the bottom faces of the first and second depressions 32, 42 throughout its length (excluding the region held by the first projection 31 and second projection 41) in this embodiment as well. The gap D1 is defined by the depth from the end face of the first projection 31 to the bottom face of the first depression 32 and the depth from the end face of second first projection 41 to the bottom face of the second depression 42. The gap D1 is set to such a size that the piezoelectric device 2 will not break even if a longitudinal end part of the piezoelectric device 2 deforms to a position in contact with the bottom face of the first depression 32 or the bottom face of the second depression 42.

First and second lid members 5, 6 will now be explained. Referring to FIGS. 15 and 16, the surfaces of the first and second lid members 5, 6 are provided with two terminal electrodes 91, 93, respectively. One terminal electrode 91 electrically connects with the first lead electrode 35 and second lead electrode 45 by way of a side electrode 95. The other terminal electrode 93 electrically connects with a connecting conductor 83 of the piezoelectric device 2 by way of a side electrode 97 (see FIG. 17).

Referring to FIGS. 15 and 17, a first space 98 fills the gap occurring between the first support member 3 and second support member 4 on their other longitudinal end side. In this embodiment, the first support member 3 has a projection 36 at the other longitudinal end part, whereas the second support member 4 has a projection 46 at the other longitudinal end part. The first spacer 98 is bonded to the projection 36 of the first support 3 and the projection 46 of the second support member 4.

Further, the first spacer 98 has an electrode (conductor) provided on its surface, whereby the first lead electrode 35 and second lead electrode 45 are electrically connected to the side electrode 95 (see FIG. 17).

As explained with reference to FIGS. 17 and 18, one longitudinal end part of the piezoelectric device 2 is held by the end faces of the first and second projections 31, 41. As a consequence, when an exciting force, a shock, or the like is applied, apart on the end side of piezoelectric device 2 opposite from the end side held by the first and second projections 31, 41 deforms in response to the exciting force, thereby generating a detection signal.

Specifically, the first projection 31 is disposed at one longitudinal end part in the first support member 3, and the second projection 41 is disposed at one longitudinal end part in the second support member 4. The piezoelectric device 2 is disposed between the first and second projections 31, 41 while longitudinally aligning with the first and second support members 3, 4. This can easily yield a structure in which one longitudinal end part of the piezoelectric device 2 is held by the first and second projections 31, 41.

Further, in this embodiment, the first support member 3 has the first depression 32 longitudinally extending from the first projection 31. Similarly, the second support member 4 has the second depression 42 longitudinally extending from the second projection 41. As a consequence, the piezoelectric device 2 can be arranged with the gap D1 from the bottom faces of the first and second depressions 32, 42 over substantially the whole length thereof. Hence, the piezoelectric device 2 can secure a space for deforming its part on the end side opposite from the end side held by the first and second projections 31, 41.

Here, the gap D1 is set to such a size that the piezoelectric device 2 will not break even if a longitudinal end part of the piezoelectric device 2 deforms to a position in contact with the bottom face of the first depression 32 or the bottom face of the second depression 42. Therefore, when the piezoelectric device 2 is deformed in response to an excessive exciting force or impact force, its longitudinal end part comes into contact with the bottom face of the first depression 32 or the bottom face of the second depression 42 before the piezoelectric device 2 breaks. The piezoelectric device 2 cannot deform more. As a consequence, the piezoelectric device 2 is reliably protected against breaking, chipping, or cracking.

Figure 20:
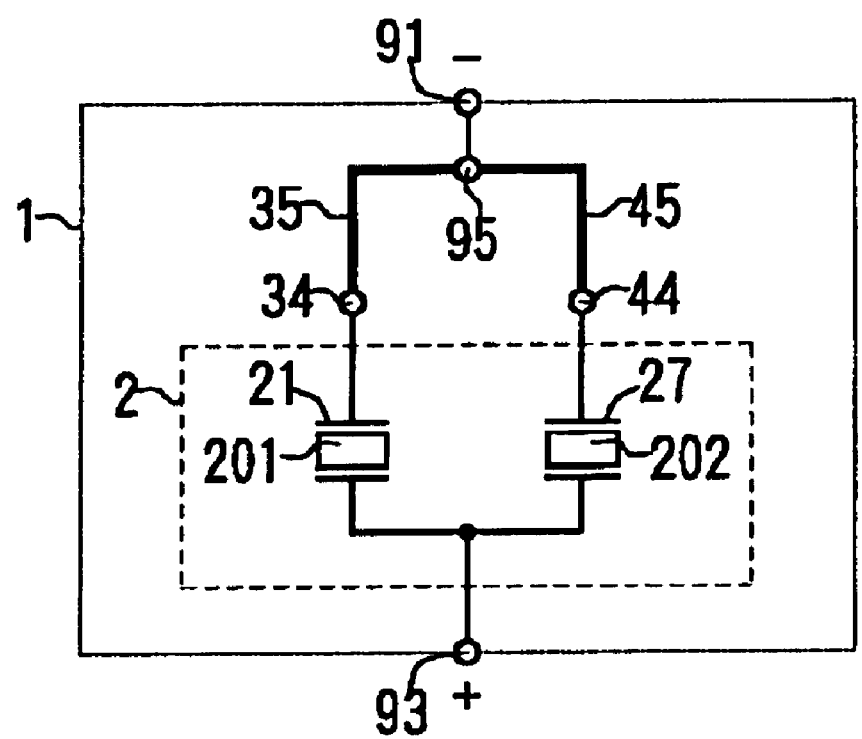
FIG. 20 is an equivalent circuit diagram of the piezoelectric sensor shown in FIGS. 15 to 19.

FIG. 20 is an equivalent circuit diagram of the piezoelectric sensor shown in FIGS. 15 to 19. In view of the equivalent circuit diagram, the piezoelectric device 2 of the piezoelectric sensor 1 includes a pair of piezoelectric devices 201, 202. One piezoelectric device 201 is constituted by the piezoelectric ceramic layers 11 to 13 and electrode films 21 to 24 included in the piezoelectric device 2 (see FIG. 17). The other piezoelectric device 202 is constituted by the piezoelectric ceramic layers 14 to 16 and electrode films 24 to 27 (see FIG. 17).

As explained with reference to FIGS. 15, 17, and 18, the first support member 3 comprises the first contact electrode 34 disposed at an end face of the first projection 31, whereas the second support member 4 comprises the second contact electrode 44 disposed at an end face of the second projection 41 in this embodiment as well. In the piezoelectric device 2, the electrode films 21, 27 among the electrode films 21 to 27 are disposed on both outer faces of the laminate formed by the piezoelectric ceramic layers 11 to 16, and are electrically connected to the first and second contact electrodes 34, 44, respectively. In such a configuration, a detection signal generated in the piezoelectric device 2 at the time when an exciting force, a shock, or the like is applied thereto is taken from the electrode films 21, 27 on both outer faces to the outside by way of the first and second contact electrodes 34, 44 (see FIG. 20).

Further, an electric path extending from the first contact electrode 34 to the terminal electrode 91 by way of the first lead electrode 35 and side electrode 95 in succession and an electric path extending from the second contact electrode 44 to the terminal electrode 91 by way of the second lead electrode 45 and side electrode 95 in succession are constructed in this embodiment as well (see FIG. 20).

Figure 21:
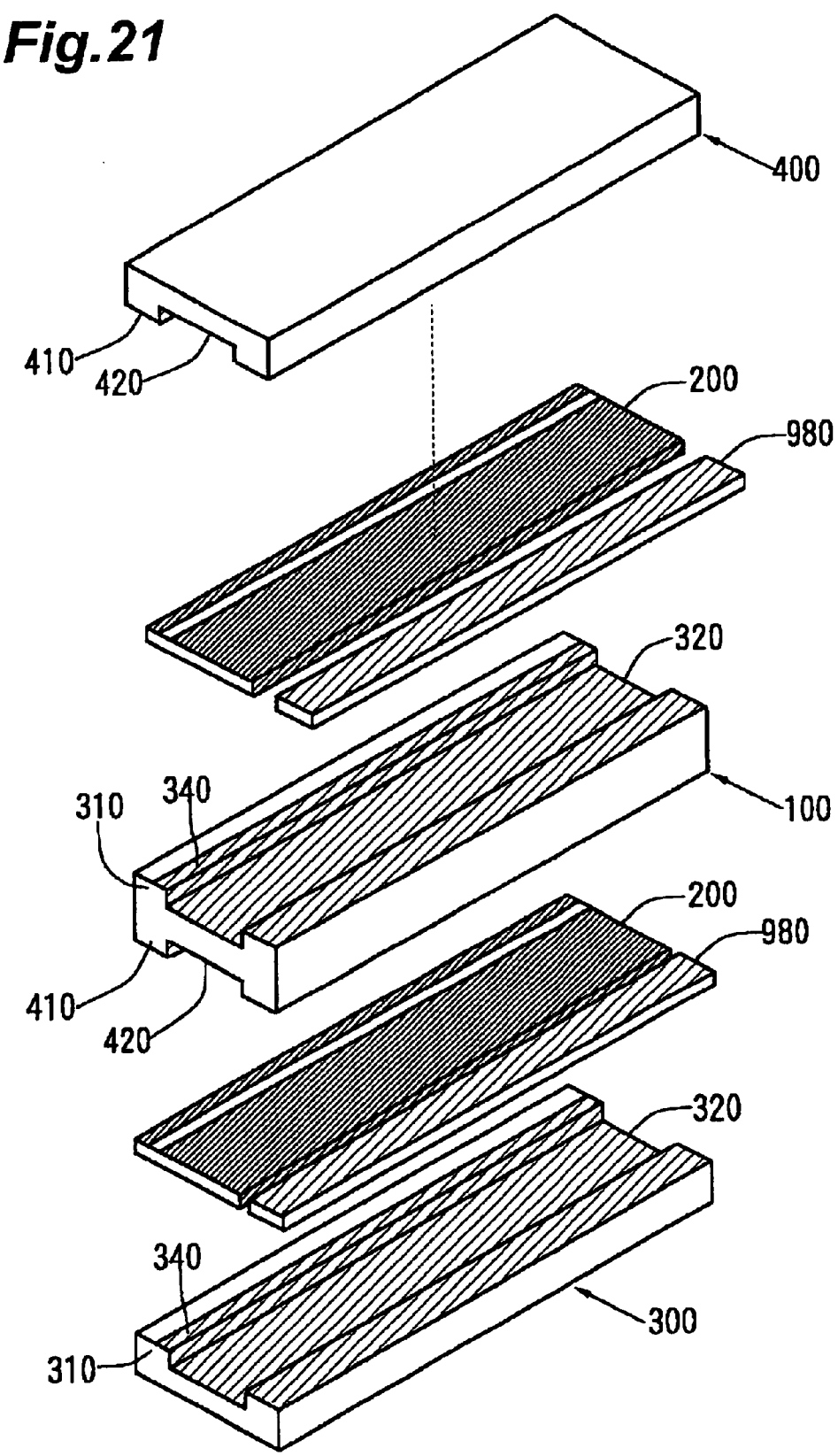
FIG. 21 is a view for explaining a method of making the piezoelectric sensor shown in FIGS. 15 to 19.
Figure 22:
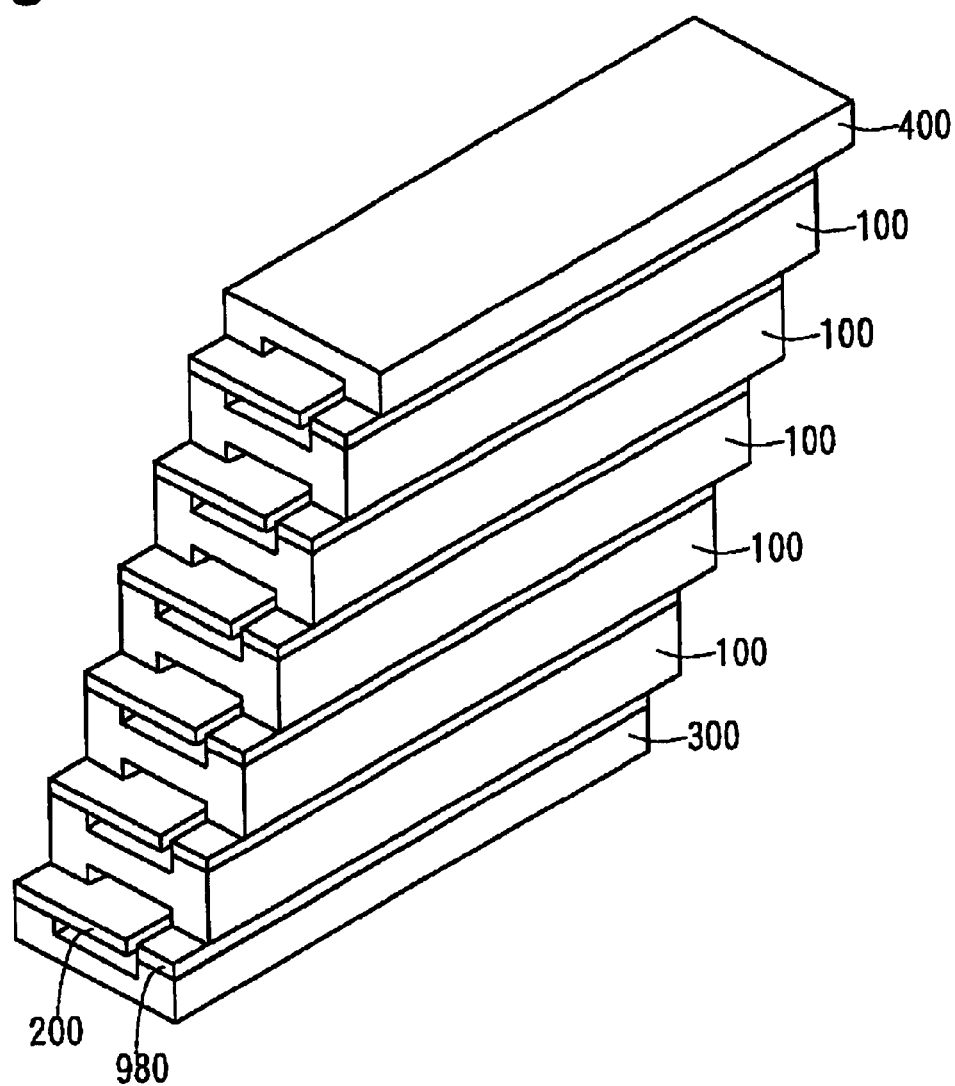
FIG. 22 is a view showing the laminate assembly obtained by way of the step shown in FIG. 21.

FIGS. 21 and 22 are views for explaining a method of making the piezoelectric sensor shown in FIGS. 15 to 19. In the drawings, constituent parts substantially identical to those shown in FIGS. 7 to 13 will be referred to with numerals identical thereto, so as to omit their overlapping explanations as much as possible.

First, as shown in FIG. 21, a piezoelectric device member 200 and a spacer member 980 are mounted on a lowermost support member 300. Subsequently, an operation of mounting an intermediate support member 100 on the piezoelectric device member 200 and spacer member 980, and then mounting a piezoelectric device member 200 and a spacer member 980 thereon is carried out repeatedly. Finally, an uppermost support member 400 is mounted on the piezoelectric device member 200 and spacer member 980. As compared with FIGS. 15 to 19, for example, the lower most support member 300 becomes the first support member (see FIGS. 15 to 19) whereas the uppermost support member 400 becomes the second support member 4. The intermediate support member 100 is divided into the first support member 3 and second support member 4.

The lower most support member 300 is provided with a first projection 310 and a first depression 320 on the upper face side for mounting the piezoelectric device member 200 and spacer member 980. The surface of the first projection 310 is formed with a first contact electrode 340.

The uppermost support member 400 is provided with a second projection 410 and a second depression 420 on the lower face side overlapping the piezoelectric device member 200 and spacer member 980. The surface of the second projection 410 is formed with a second contact electrode (not depicted).

The upper face side of the intermediate support member 100 is provided with a first projection 310 and a first depression 320. The surface of the first projection 310 is formed with a first contact electrode 340. The lower face side of the intermediate support member 100 is formed with a second projection 410 and a second depression 420. The surface of the second projection 410 is formed with a second contact electrode (not depicted). FIG. 22 is a perspective view of the laminate assembly obtained by way of the laminate assembling step shown in FIG. 21.

Subsequent steps are similar to those shown in FIGS. 9 to 13, and their overlapping explanations will be omitted.

Though the present invention is explained specifically with reference to the individual embodiments, they do not restrict the present invention. For example, a mode combining these embodiments can be constructed.

As explained in the foregoing, the present invention can provide a piezoelectric sensor which can improve electric charge sensitivity and can be made smaller.

The basic Japanese Patent Application No. 2002-14675 filed on Jan. 23, 2002 is hereby incorporated by reference.

What is claimed is:

1. A piezoelectric sensor comprising:
   a piezoelectric device including a plurality of electrode films and a plurality of piezoelectric ceramic layers;
   a first support member having a first projection; and
   a second support member having a second projection;
   wherein said piezoelectric ceramic layers have a number of at least 4 and are alternately laminated with said electrode films;
   wherein said first and second support members are arranged such that said first and second projections are opposed to each other; and
   wherein said piezoelectric device is disposed between said first and second projections and held between an end face of said first projection and an end face of said second projections;
   said piezoelectric device has a longitudinally intermediate part held between said end faces of said first and second projections;
   said first projection is disposed at a longitudinally intermediate part of said first support member;
   said second projection is disposed at a longitudinally intermediate part of said second support member;
   said piezoelectric device is disposed between said first and second projections while longitudinally aligning with said first and second support members;
   said first support member further comprises a first depression, said first depression longitudinally extending on each side of said first projection; and
   said second support member further comprises a second depression, said second depression longitudinally extending on each side of said second projection.

2. The piezoelectric sensor according to claim 1, wherein some of said electrode films are connected to each other by way of a through hole formed in said piezoelectric ceramic layers.

3. The piezoelectric sensor according to claim 1, wherein said piezoelectric device is arranged with a gap from bottom faces of said first and second depressions throughout the length of said piezoelectric device; and
   wherein said gap is set to such a size that said piezoelectric device is kept from breaking even when a longitudinal end part of said piezoelectric device deforms to a position in contact with said bottom face of said first depression or said bottom face of said second depression.

4. The piezoelectric sensor according to claim 1, wherein said first support member comprises a first contact electrode at an end face of said first projection;
   wherein said second support member comprises a second contact electrode at an end face of said second projection; and
   wherein, in said piezoelectric device,
   said electrode films are disposed between said piezoelectric ceramic layers, and on both outer faces of a laminate formed by said piezoelectric ceramic layers,
   said electrode films on said both outer faces being electrically connected to said first and second contact electrodes, respectively, by said holding.

5. The piezoelectric sensor according to claim 4, wherein said first support member comprises a first lead electrode on a surface thereof, said first lead electrode electrically connecting with said first contact electrode; and
   wherein said second support member comprises a second lead electrode on a surface thereof, said second lead electrode electrically connecting with said second contact electrode.

6. A piezoelectric sensor comprising:
   a piezoelectric device including a plurality of electrode films and a plurality of piezoelectric ceramic layers;
   a first support member having a first projection; and
   a second support member having a second projection;
   wherein said piezoelectric ceramic layers have a number of at least 4 and are alternately laminated with said electrode films;

wherein said first and second support members are arranged such that said first and second projections are opposed to each other; and wherein said piezoelectric device is disposed between said first and second projections and held between an end face of said first projection and an end face of said second projection, said piezoelectric device has a longitudinal end part held by end faces of said first and second projections.

7. The piezoelectric sensor according to claim 6, wherein said first projection is disposed at a longitudinal end part of said first support member;

wherein said second projection is disposed at a longitudinal end part of said second support member; and wherein said piezoelectric device is disposed between said first and second projections while longitudinally aligning with said first and second support members.

8. The piezoelectric sensor according to claim 7, wherein said first support member further comprises a first depression, said first depression longitudinally extending from said first projection; and wherein said second support member further comprises a second depression, said second depression longitudinally extending from said second projection.

9. The piezoelectric sensor according to claim 8, wherein said piezoelectric device is arranged with a gap from bottom faces of said first and second depressions throughout the length of said piezoelectric device; and wherein said gap is set to such a size that said piezoelectric device is kept from breaking even when a longitudinal end part of said piezoelectric device deforms to a position in contact with said bottom face of said first depression or said bottom face of said second depression.

10. The piezoelectric sensor according to claim 6, wherein some of said electrode films are connected to each other by way of a through hole formed in said piezoelectric ceramic layers.

11. The piezoelectric sensor according to claim 6, wherein said first support member comprises a first contact electrode at an end face of said first projection;

wherein said second support member comprises a second contact electrode at an end face of said second projection; and wherein, in said piezoelectric device, said electrode films are disposed between said piezoelectric ceramic layers, and on both outer faces of a laminate formed by said piezoelectric ceramic layers, said electrode films on said both outer faces being electrically connected to said first and second contact electrodes, respectively, by said holding.

* * * * *

UNITED STATES PATENT AND TRADEMARK OFFICE
CERTIFICATE OF CORRECTION

PATENT NO. : 6,800,986 B2  
DATED : October 5, 2004  
INVENTOR(S) : Katsumi Yamauchi Page 1 of 1

It is certified that error appears in the above-identified patent and that said Letters Patent is hereby corrected as shown below:

Title page,
Item [30], should read:
-- [30]   Foreign Application Priority Data
Jan. 23, 2002    (JP) ........................P2002-014675 --.

Signed and Sealed this

Twenty-first Day of February, 2006

JON W. DUDAS  
*Director of the United States Patent and Trademark Office*